Patented Nov. 5, 1940

2,220,331

UNITED STATES PATENT OFFICE 2,220,331

REMEDY FOR INFECTION BY COCCI AND PROCESS OF MANUFACTURING IT

Robert Hilgermann, Landsberg, Warthe, and Maria Hilgermann, Berlin, Germany, assignors, by mesne assignments, to Schering Corporation, Bloomfield, N. J., a corporation of New Jersey No Drawing. Application February 23, 1937, Serial No. 127,194. In Germany February 28, 1936

15 Claims. (Cl. 167—65)

The present invention relates to a novel mixture of ingredients resulting from combinations of the gall and albumin and refers more particularly to a mixture adapted to cure infection diseases.

It is an object of the invention to provide an efficient means for killing or destroying and dissolving so-called cocci such as for example the pneumococcus, gonococcus, meningococcus, streptococcus and similar cocci.

Another object of the invention is to provide a constant or stable solution of salts of the acids contained in the bile in an alkaline state, and a special object is the preparation of a slightly alkaline constant or stable solution of sodium taurocholate.

A principal object of our invention is the production of a new remedy against the so-called streptococcus sepsis.

Further objects will become apparent from the following description:

It is known that gall or salts of the acids contained in the bile, respectively, such as can be prepared from the gall or synthetically, have a dissolving effect with regard to various exciters of infection. However, up to the present it has not been possible to make use of these facts for the preparation of an effective remedy for such infections, in particular for the streptococcus infection or sepsis, which so far has been considered incurable.

Particular difficulties have hitherto been encountered in preparing slightly alkaline solutions of alkali salts of the acids contained in the bile, for instance of sodium taurocholate, such as for example solutions having a concentration of the hydrogen ions (a pH-value) of 8 to 14 of a constant or stable nature, since such solutions are easily decomposed by the carbonic acid of the air and other influences and consequently change their pH-value. As soon, however, as the solution undergoes an acid reaction, it does not any more destroy the exciters of infection.

Our invention relates to a remedy which has been proved by clinical trials to cure positively of such contagious diseases. In order to prepare this remedy, proteolysis is carried to a point where the albumin cannot coagulate any more. In the presence of salts of the acids contained in the bile in a slightly alkaline state this combination produces the effect above described. A slightly alkaline state in this case is understood to be a concentration of hydrogen ions (a pH-value) between 8 and 14. The pH-value is preferably kept at approximately 9.

In preparing the solution of the decomposed albumin, human albumin is chiefly used if the remedy is to be used for human patients, if for diseased animals, other, principally animal albumin may also be used. The use of an albumin containing blood corpuscles is of importance in this connection. In particular the blood itself, preferably in the form of crassament or organs rich of blood may be subjected to decomposition. Besides, human trans- or exudations containing fibrinogen may be used such as the liquid collecting in dropsy of the belly (ascites) the liquid present in hydrocephalus (hydrocelene liquid), the liquid collecting after inflammation of the lungs or after pleuritis (pleura exudations), moreover lymph and chyle.

Of salts of the acids contained in the bile the sodium taurocholate may be used in the first line, but also combinations containing glycocholic acid or cholic acid come into consideration which are prepared from gall, but may also be made synthetically. These salts of the acids contained in the bile are used in concentrations between about 0.01 and 5%, preferably between 0.1 and 0.5%, preparing the solution in absolutely pure, preferably double-distilled water. The required pH-value is preferably adjusted by adding a weak soda solution such as $1/10$, $1/70$ or $1/100$ of normal concentration.

The above mentioned compound of decomposed albumin is preferably prepared by dissolving the albuminous material in gall. Natural ox-gall may be used or a synthetic mixture of the essential ingredients of the gall showing also this dissolving effect. A mixture of this nature can be prepared for example from alkali salts of the acids contained in the bile, lecithine, cholesterine, urea and uric acid. The dissolving process is carried on to full saturation, and the preparation obtained is decanted off the excessive undissolved albumin, if necessary. In some instances the presence of salts of the acids contained in the bile, in particular of sodium taurocholate in such solutions is already sufficient to obtain the concentration of the said ingredients in the finished solution required for the purpose of our invention, obviating thereby any further addition of sodium taurocholate to the obtained solution of decomposed albumin.

In preparing the combination described it is advisable to allow the mixture of albumin and gall to settle a considerable time, about 12 to 24 hours, shaking or stirring it at intervals and preferably keeping it at a temperature above normal of for example 37° C. An advantage has been obtained by heating the mixture to temperatures of about 100° C.

Since in many cases our novel remedy may have to be made from albumin the sterility of which is not absolutely assured, and since on the other hand the preparation of an absolutely sterile solution is a positive necessity, it is recommendable to sterilize the mixture when decomposing the albumin; this sterilizing process is carried on by heating the albumin mixture to temperatures above 100° C. together with a conserving agent such as carbolic acid, preferably by means of superheated steam.

Of the solution of decomposed albumin obtained in this way, a quantity of about 1 to 4%, preferably about 2½ to 3% is added to the said solution of sodium taurocholate adjusted to be suitable concentration of hydrogen ions. The percentages stated in this specification are understood to be by weight, not by volume. If sufficient salts of the acids contained in the bile are already present in the albumin solution, it is merely necessary to dilute it correspondingly, for example by adding to it 30 to 35 parts of very pure water and to adjust it to the suitable hydrogen ion concentration.

This preparation will keep its adjusted pH-value for a long time and may therefore be considered as absolutely constant or stable.

The remedy prepared in this manner may be filled into ampullae. Generally speaking, the remedy is injected intravenously and it possesses the advantage that any number of injections may be made without in any way injuring or incommodating the patient, even 60 injections and more will not produce any anaphylacteric shock. The remedy cures positively any case of septical poisoning such as will occur especially after confinements which cases were hitherto known to the medical world as incurable. Also the many cases of blood poisoning, for example those contracted by surgeons in operations are positively cured by this remedy in any case whereas up to the present such cases have been fatal as a rule or necessitated at least the amputation of a limb.

While we have herein shown and described certain preferred embodiments of our invention, we wish it to be understood that we do not confine ourselves to all the precise details herein set forth by way of illustration, as modification and variation may be made without departing from the spirit of the invention or exceeding the scope of the appended claims.

Having thus described our invention, what we claim is:

1. As a novel combination of ingredients a solution of sodium taurocholate and albumin containing blood corpuscles, said albumin decomposed to a degree precluding any coagulation and said solution showing a hydrogen ion concentration (pH-value) of about 9.

2. As a novel combination of ingredients a remedy for infectious diseases caused by cocci, said remedy consisting of a solution containing 0.01 to 5% sodium taurocholate and 1 to 4% albumin containing blood corpuscles, said albumin decomposed to a degree precluding any coagulation and said solution showing a pH-value of about 9.

3. As a novel combination of ingredients a remedy for streptococcus sepsis consisting of a 0.3% solution of sodium taurocholate to which have been added 3% of a solution of human blood corpuscles in gall, the whole showing a pH-value of about 9.

4. A process of preparing a remedy for infectious diseases consisting in that crassament is decomposed to a degree precluding coagulation of the albumin, that sodium taurocholate is added and the entire mixture is made slightly alkaline by adding a diluted solution of soda.

5. A process of preparing a remedy for infectious diseases caused by cocci, consisting in that albumin is dissolved in gall containing a substantial amount of bile salts, the solution obtained is decanted off the undissolved matter and the said solution is adjusted by diluting to a pH-value of about 9.0.

6. A process of preparing a remedy for infectious diseases consisting in that albumin containing blood corpuscles is dissolved in gall containing a substantial amount of bile salts during at least half a day, the solution obtained being diluted by means of a 30 to 35-fold quantity of very pure water and the resulting solution adjusted to a pH-value of 9.0.

7. A process of preparing a remedy for infectious diseases consisting in that gall is treated with an excess of albumin until no more albumin dissolves in the gall, the solution being decanted off the undissolved matter and 3 parts of the said solution being added to 100 parts of a solution of sodium taurocholate in very pure water and the entire mixture being adjusted to a pH-value of 9.0.

8. In a process of preparing a remedy for streptococcus sepsis the steps which comprise dissolving in gall at a raised temperature albumin containing blood corpuscles and fibrinogen until the gall is saturated, decanting the solution obtained off the undissolved matter, preparing a 0.3% solution of sodium taurocholate, adding the albumin-gall solution to the sodium taurocholate solution and adjusting the entire mixture to a pH-value of 9.0.

9. In a process of preparing a remedy for streptococcus sepsis the steps which comprise dissolving crassament in gall at raised temperature during at least half a day, decanting off the undissolved matter, subsequently heating the mixture during a short time to over 100° C., preparing a solution of sodium taurocholate of a pH-value of 9.0 and adding the albumin-gall solution to the solution of sodium taurocholate.

10. In a process of preparing a remedy for streptococcus sepsis the steps which comprise dissolving human crassament in ox-gall at about 37° during at least half a day, decanting the solution off the undissolved matter, heating this solution by means of steam at a temperature over 100° C. during a short time, preparing a 0.3% solution of sodium taurocholate in very pure double-distilled water, adjusting this solution to a pH-value of 9.0 and adding 3% of the albumin-gall solution to the solution of sodium taurocholate.

11. A method of preparing a stable, alkaline solution of at least one salt of the acids contained in bile which comprises providing such a bile solution, making the same slightly alkaline, and adding thereto a protein which is degenerated to such an extent that it no longer coagulates.

12. A method of preparing a stable, alkaline solution of at least one salt of the acids contained in bile which comprises providing such a bile solution, making the same slightly alkaline, and adding thereto a protein derived from human beings which is degenerated to such an extent that it no longer coagulates.

13. A method of preparing a stable, alkaline solution of at least one salt of the acids contained in bile which comprises providing such a bile solution, making the same slightly alkaline, and adding thereto a protein, allowing said protein to become degenerated to such an extent that it no longer coagulates.

14. A method of preparing a stable, alkaline solution of at least one salt of the acids contained in bile which comprises providing such a bile solution, making the same slightly alkaline, the pH value being about 9, and adding thereto a protein which is degenerated to such an extent that it no longer coagulates.

15. A method of preparing a stable, alkaline solution of at least one salt of the acids contained in bile which comprises providing such a bile solution, making the same slightly alkaline, and adding thereto a protein which is degenerated to such an extent that it no longer coagulates, and diluting the solution at least 30 fold with water.

ROBERT HILGERMANN.
MARIA HILGERMANN.